United States Patent [19]

Johnson

[11] 4,337,992
[45] Jul. 6, 1982

[54] HOLOGRAM MOVIE PROJECTION APPARATUS

[76] Inventor: Kenneth C. Johnson, 1215 Brewster Dr., El Cerrito, Calif. 94530

[21] Appl. No.: 140,754

[22] Filed: Apr. 16, 1980

[51] Int. Cl.³ .............................................. G03H 1/04
[52] U.S. Cl. ................................................. 350/3.79
[58] Field of Search ...................... 350/3.75, 3.78, 3.79

[56] References Cited

U.S. PATENT DOCUMENTS

| | | | |
|---|---|---|---|
| 3,511,553 | 5/1970 | Gerritsen et al. | 350/3.79 |
| 3,545,834 | 12/1970 | Gerritsen et al. | 350/3.79 |
| 3,606,517 | 9/1971 | Jacobson et al. | 350/3.79 |
| 3,625,584 | 12/1971 | St. John | 350/3.79 |
| 3,632,869 | 1/1972 | Bartolini | 350/3.79 X |

OTHER PUBLICATIONS

De Bitetto, D. J.; "A Front-Lighted 3-D Holographic Movie" *Applied Optics*, vol. 9, No. 2, Feb. 1970, pp. 498–499.

*Primary Examiner*—John K. Corbin
*Assistant Examiner*—Bruce Y. Arnold

[57] ABSTRACT

A shutterless hologram movie apparatus using an incoherent (non-laser) light source in the viewing apparatus. Image immobilization and dispersion compensation are both accomplished with the same reference beam-forming optics. The hologram film is imaged onto the exit pupil by means of a converging lens or mirror in the vicinity of the image. As the hologram film is drawn vertically across the reference beam, horizontal time frame bands on the film scan the exit pupil, resulting in apparent motion of the image.

1 Claim, 9 Drawing Figures

HOLOGRAM MOVIE PROJECTION APPARATUS

Various methods have in the past been advanced for producing moving imagery by means of a shutterless holographic movie system. The simplest method (U.S. Pat. No. 3,511,553) takes advantage of the image immobilization property of holograms. By properly configuring the reconstructing reference beam of a hologram, the location of reconstructed imagery in a preselected image plane may be made positionally independent of translational motion of the hologram, as long as the hologram surface is confined to a plane. Thus, a hologram film strip moving continuously across a stationary reference beam may be made to generate an immobile, flat image in space; with temporal variation introduced by time-framing the film.

Three dimensional objects of significant depth may similarly be recorded by reducing the height of the frames to a very small value (on the order of 1 mm). Each frame is recorded from the same vertical position in relation to the subject, so vertical parallax is lost in the reconstructed image. However, full horizontal parallax and depth are reproduced in the reconstructed image, so that the image appears fully three dimensional when observed from a normal viewing position with both eyes confined to the same horizontal plane. As the film is drawn vertically across the reference beam, the frames appearing behind a specific object point generate incrementally varying images of the point, creating the illusion of movement. (See the article by DeBitteo in Applied Optics, Vol. 9, No. 2, February 1970, pp. 498-499 for a description of this technique.)

Two limitations are inherent in this method: Firstly, the size of the reconstructed image is limited by the size of the hologram; and secondly, there is a temporal disparity across the vertical extent of the image (eg.: a vertical ladder turning about a vertical axis will appear as a rotating helix), requiring that the average time increment between frames be smaller than would normally be required to produce smooth motion of the imagery. Both of these drawbacks are eliminated by an alternative technique, whereby a single frame is viewed at a time through a dispersive lenticular screen in the image space (U.S. Pat. No. 3,625,584). Each frame is essentially a horizontal line, of insignificant height. (The lenticular screen spreads the image light uniformly over the vertical extent of the viewing area.) The required width of each frame is minimized by means of image-reducing cylindrical optics and (optionally) a horizontal dispersive medium in front of the frame. This system also has drawbacks, however. The lenticular screen in the image space is inconvenient for up-close viewing, and limits the uniformity and the efficiency with which the vertical extent of the exit pupil (viewing area) is illuminated; and the limitation of the image source to a single narrow frame requires that the hologram be capable of tolerating momentarily intense radiation levels. Furthermore, this and other hologram movie schemes require the use of a laser light source for viewing, severely limiting their applicability and practicality.

Another method for generating three dimensional moving imagery is that implemented in the cylindrical lenticular holograms currently employed as advertising displays. These displays exhibit a horizontal perspective disparity, in that the perspective from which the image is viewed cannot be varied without simultaneously varying the time frame in which it is viewed.

An object of the present invention is to provide a means of generating holographic movies which may be implemented using an incoherent (eg.: an arc lamp) light source in the viewing apparatus.

Another object of the present invention is to provide a means of generating three dimensional moving imagery from a hologram; wherein the minimum size of the hologram is limited only by the size of the system exit pupil, and not by the size of the subject imagery.

A further object of the present invention is to provide means of generating three dimensional moving imagery; wherein no temporal disparity exists across either the vertical of horizontal fields of view, or across the horizontal exit pupil (horizontal perspective) dimension.

A further object of the present invention is to provide a means of generating three dimensional moving imagery of significant height, visible over an exit pupil of significant height; without requiring the use of a lenticular screen or other dispersive media in the image space of the viewing apparatus, and suitable for up-close viewing.

Reference will be made in the following description to the drawings.

Figure 1:
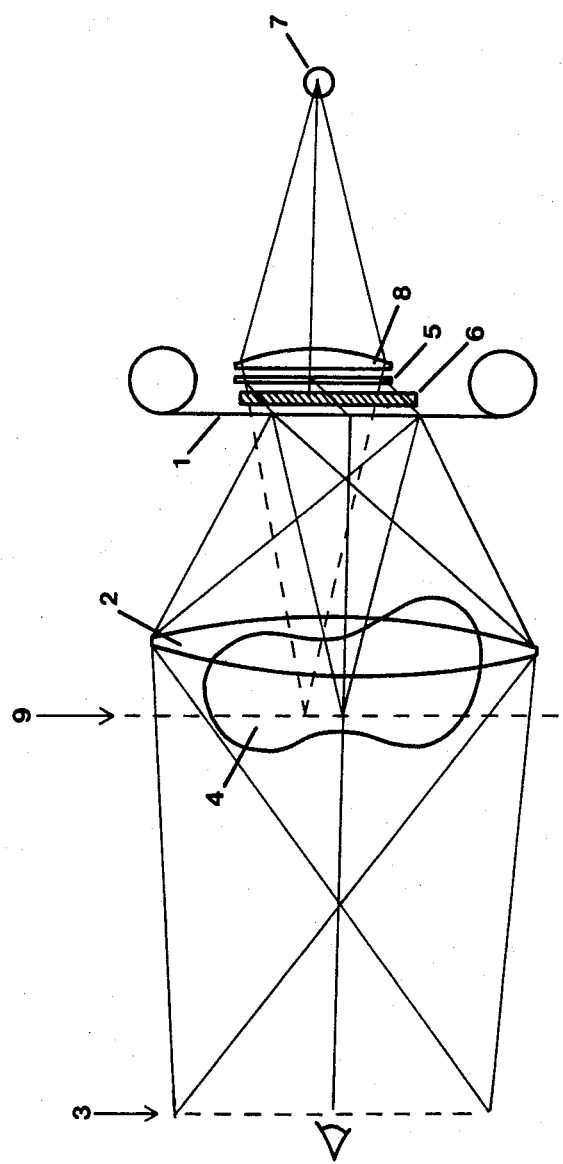
FIG. 1 is an optical schematic showing the basic elements of the invention.

FIG. 1 illustrates an embodiment of the invention in elevated view. The hologram 1 has the form of a vertical film strip which moves vertically across a stationary reference beam. The hologram is subdivided into narrow horizontal bands (time frames), each of which records the image at a specific instant in time. The pupil condenser lens 2 images the hologram onto the exit pupil 3 where the viewer's eye is normally located. The height of the image of an individual frame in the exit pupil is comparable to the eye pupil aperture size, so that light entering the eye aperture at any instant in time will originate from no more than several frames. Each frame generates an image 4 of the subject in the general vicinity of the pupil condenser lens. As the film moves vertically, the frames scan the exit pupil, resulting in apparent motion of the image.

The image is reconstructed from an off-axis reference beam. The reference beam is diverted from a source beam by means of a diffraction grating 5 and passes through a louvered filter 6 which acts as a zero order stop. The source beam originates from an arc lamp 7, which is imaged by means of a lamp condenser lens 8 onto the center of the image. (The louvered filter, diffraction grating, and lens would form a layered unit. Alternatively, the lens could be located in front of the hologram, or between the hologram and the grating.)

Figure 2:
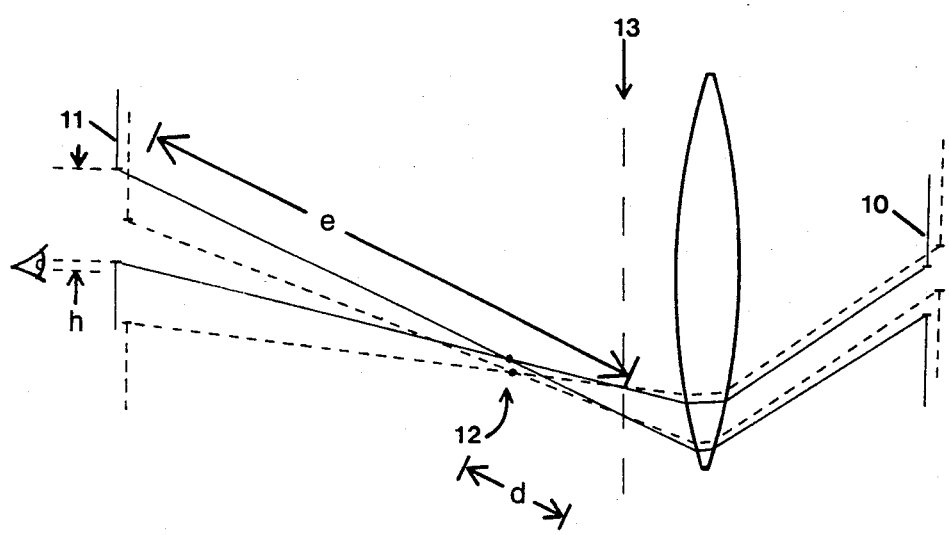
FIG. 2 illustrates how image points in a designated central image plane 13 remain stationary as the hologram film is moved, whereas film motion gives rise to a slight vibratory motion of points distant from the stationary zone 13.

The lens, grating, and louver assembly would perform the following three functions:

1. Zero order light (direct specular light from the lamp) would be eliminated from the image.
2. The image would be made precisely dispersionless at the lamp image point (no color fringing at the center of the image).
3. A "stationary zone" would exist in the lamp image plane 9. By "stationary zone" is indicated a surface in which the image appears motionless as a single frame is scanned over the eye space in the exit pupil. Points on the image not in the stationary zone will appear to move slightly in a vertical direction as the frame moves vertically. (See FIG. 2: The solid and dotted lines represent two different positions of the frame aperture 10, its image 11 in the exit pupil, and the rays generating an image point 12 for the two respective frame locations.) If the individual frame is visible to the eye as the frame image in the exit pupil traverses a vertical distance h, then the image point will appear to move a distance h(d/e) as the frame image traverses the eye pupil, where d is the distance from the image point to the stationary zone 13; and e is the nominal eye relief, the distance from the eye to the stationary zone. The succeeding frame will restore the image point to its original apparent position and repeat the motion, thus resulting in a slight vibratory point spread which will appear as a uniform vertical point spread if the frame scan rate is high enough.

Figure 3:
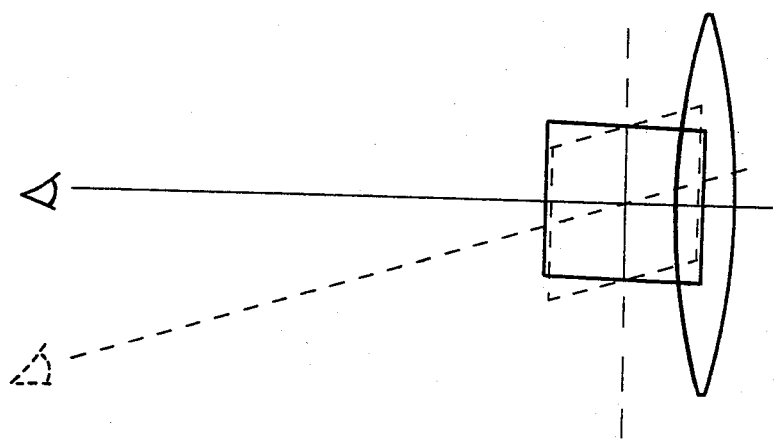
FIG. 3 shows how the image appears to always be seen from the same vertical perspective, irrespective of the viewing elevation.

If the image vibration would be noticeable, the vibratory point spread may be replaced with an equivalent stationary point spread by moving the image's vertical focal plane (the position of an image point as viewed through a narrow vertical slit) into the stationary zone. (The method by which this is accomplished will be described below.) This step has no adverse effect on the image, since the image is devoid of vertical parallax anyway. FIG. 3 illustrates how the image appears to "rock" across the stationary zone as the eye moves vertically in the exit pupil, i.e., an image point appears to move vertically as the viewing elevation changes, in such a way that the same horizontal line in the stationary zone is always seen behind the point. Horizontal depth and parallax are accurately reproduced in the reconstructed image, however; hence the image will appear fully three dimensional if viewed from a fixed elevation with the viewer's eyes confined to a horizontal plane.

Figure 4:
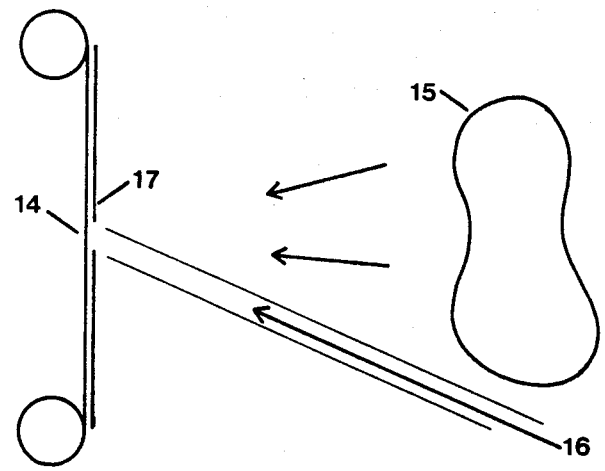
FIGS. 4 and 5 illustrate a basic two-step recording process for constructing the hologram movie film.

The hologram film would be constructed through a two step image transfer process. (Refer to FIGS. 4 and 5.) First, a master hologram 14 would be formed directly from a coherently illuminated object 15 and a reference beam 16. The master hologram would comprise a vertical film strip located (in relation to the object) in the exit pupil. It would be subdivided into narrow horizontal bands, each recorded at the center of the exit pupil and representing a single time frame. (A frame aperture 17 would delimit each frame during recording.) A continuously moving object could be recorded, using a pulsed laser synchronised with the film advance; or a continuous laser could be used to record the image, advancing the film manually and changing the position or configuration of the object incrementally between film exposures. A transfer hologram would then be recorded from the master (FIG. 5) by projecting the image 18 from each master frame into the condenser lens vicinity by means of a time reversed reconstructing reference beam 19; and combining the reconstructed light with another reference beam 20 at the surface of the transfer hologram 21, located in the image plane of the master hologram.

Figure 6:
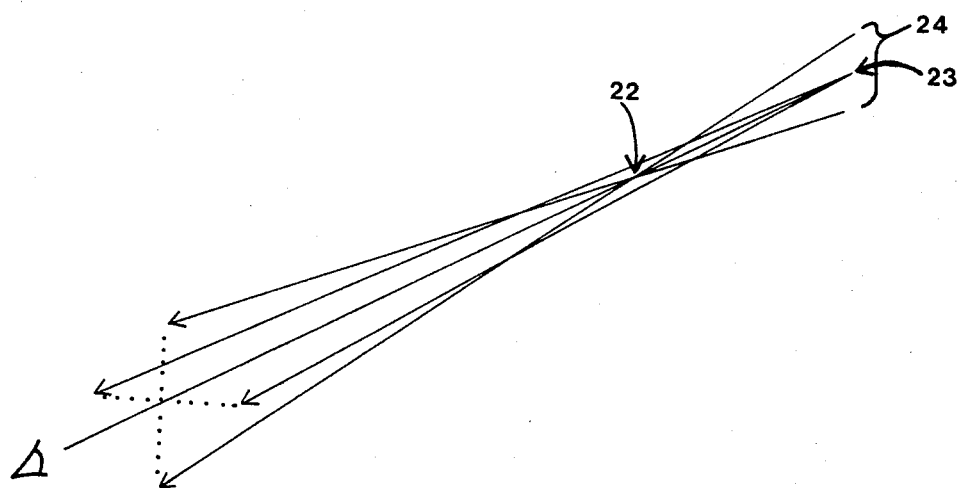
FIG. 6 illustrates the astigmatic image geometry induced by a lenticular screen in the recording optics.

If the vibratory point spread in the reconstructed image would be noticeable, it could be reduced to a stationary uniform point spread by incorporating the following changes in the construction optics; The master frames would be reduced to line holograms (or the reconstructing reference beam in the transfer phase would be apertured down to a horizontal line on the master frame), and a dispersing medium such as a lenticular screen would be placed in the stationary zone during the transfer phase, such that a ray transmitting through the stationary zone toward the transfer hologram would be spread into a vertical fan covering the height of the transfer frame. (A frame aperture would probably need to be placed in front of the transfer frame to stop spillover light.) A lenticular screen used for this purpose would comprise a transparent substrate with horizontal parallel cylindrical lens elements on its surface, with the height of the individual elements not exceeding the image resolution limit. The incorporation of the dispersing medium in the stationary zone during the transfer phase of the hologram construction has the effect of astigmitizing the image (see FIG. 6), collapsing the vertical image focus 22 into the stationary zone without deviating the horizontal focus 23 from the true image location. By this means, the vibratory point spread due to the film motion is replaced by an equivalent stationary astigmatic point spread 24.

An alternative recording technique may be used to construct the hologram directly from a set of object transparencies (eg.: standard cinematic film frames), each transparency representing the object in a particular time frame as viewed from a particular horizontal perspective. By this method, the hologram film strip would be divided into a matrix array of elemental holograms; with matrix rows representing time frames, and columns representing horizontal perspective frames. Each hologram element would be recorded from a single transparency by means of an optical imaging system (cf. FIG. 7) whereby a small coherent diffuse object source 25 illuminating the transparency 26 is imaged onto the exit pupil 27, and hence onto a hologram element 28; and the transparency is focused into the image space. (Note that collimated imagery may be produced by this method.) If image vibration in the reconstructed image is to be eliminated, the diffuse source would be reduced to a short horizontal line source, and a vertically dispersing medium would be placed in the stationary zone.

Figure 5:
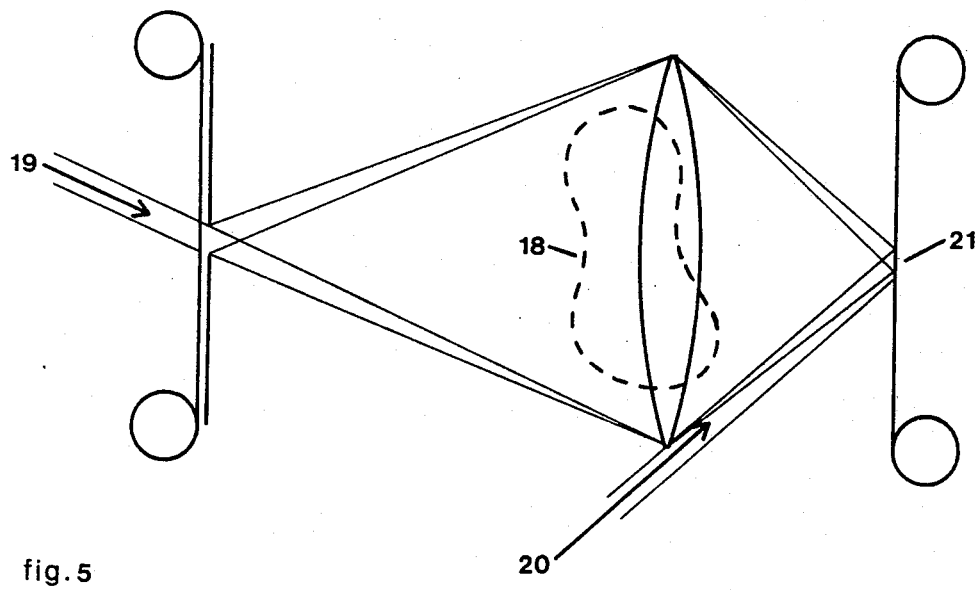
Figure 7:
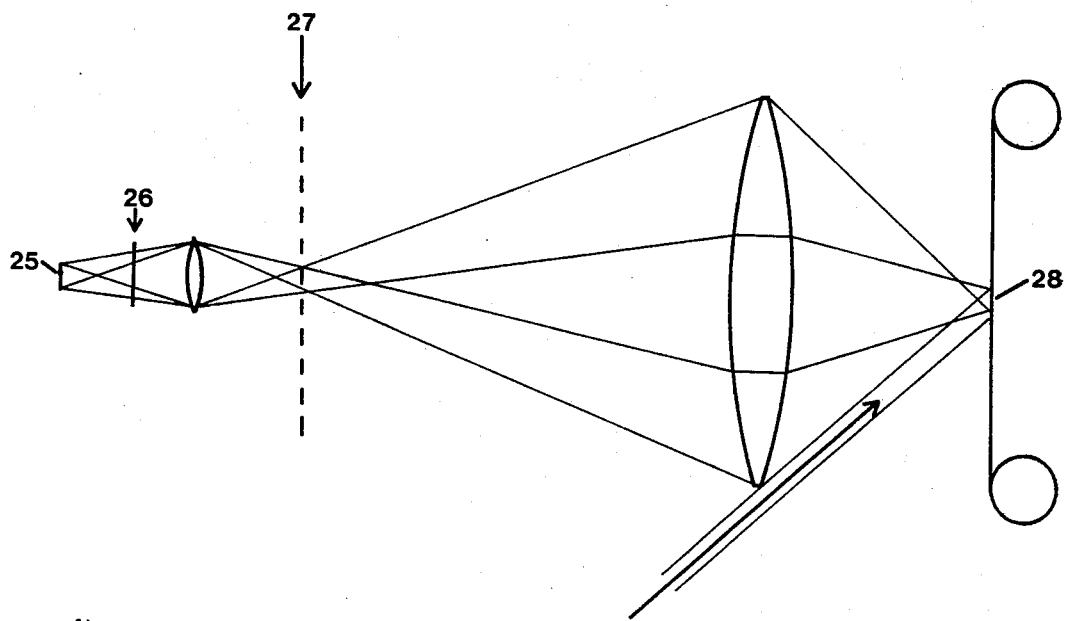
FIG. 7 illustrates a recording process for constructing each hologram movie frame from a set of individual horizontal perspective transparencies.

The hologram formed according to the above procedure and the condenser lens employed in the construction optics would be located in the viewing apparatus as shown in FIG. 1, with their relative orientation identical to that of the construction optics configuration (FIG. 5 or 7). The image generated by the viewing apparatus, when viewed from the location of the master frame aperture 17, will accurately represent the subject, irrespective of the imaging quality of the condenser lens 2. A lens of poor imaging quality will cause the hologram frames to be overlapped, or multiplexed, to some degree; but will not influence the quality of the reconstructed image as viewed from the middle of the exit pupil. (There may, however, be some marginal distortion induced by the lens toward the top and bottom of the exit pupil.)

The resolution of the reconstructed image will be limited by three factors: firstly, by the vibratory or astigmatic point spread discussed above, which vanishes in the stationary zone and varies over a range proportional to the image depth; secondly, by a uniform point spread determined by the size of the lamp arc and roughly equivalent to the image of the arc through the lamp condenser lens 8; and thirdly, a dispersion induced radial point spread which vanishes at the center of the image and increases toward the extremities. If the lamp image through the lamp condenser lens 8 is located substantially at the center of the pupil condenser lens 2, then the dispersion spread at a radius r in the pupil condenser lens would be roughly $r(\Delta\lambda/\lambda)$, where $\lambda$ is the mean wavelength of the light source and $\Delta\lambda$ is its (photopic) bandwidth.

Figure 8:
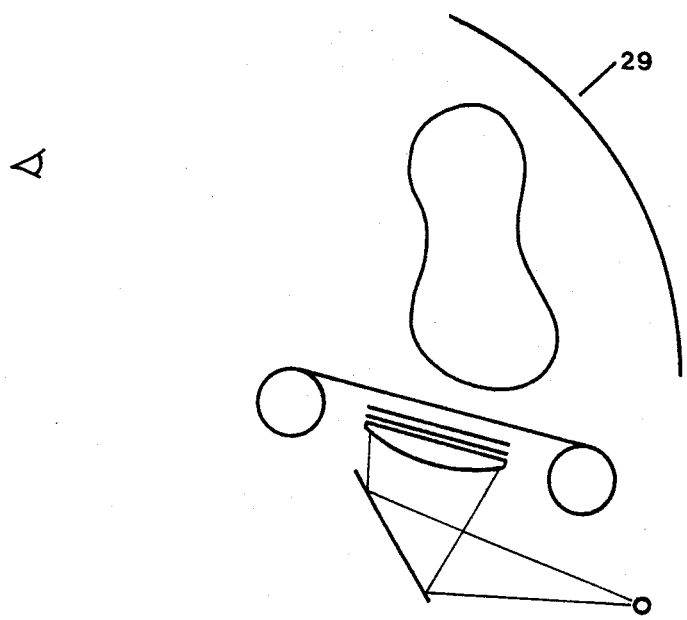
FIGS. 8 and 9 illustrate two alternative embodiments of the invention.
Figure 9:
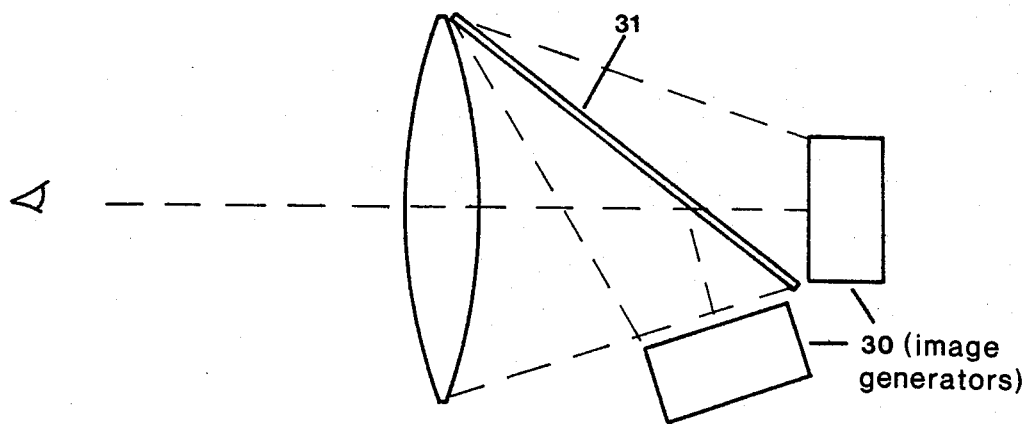

FIGS. 8 and 9 illustrate two alternative embodiments of the invention. FIG. 8 depicts the use of a large converging mirror 29 in place of the pupil condenser lens 2. FIG. 9 shows a method for combining two image generators 30 (by means of a dichroic or polarizing mirror 31) either to form a multicolor image, or to superimpose two images with their resolution optimized in different image planes. (The stationary zones of the two images need not overlap.) The same end could be achieved by multiplexing or layering two or more holograms on a single film substrate, each reconstructed from a different reference beam. (The diffraction grating 5 would in this case consist of two or more multiplexed or layered gratings with different spectral and directional diffraction characteristics.)

What is claimed is:

1. A means of generating three dimensional moving imagery comprising:

a hologram medium comprising elemental time frame holograms recorded on a hologram film or films as narrow juxtaposed bands oriented transversely to the long dimension of said hologram film(s), appropriate mechanism whereby said hologram film(s) is (are) drawn across a stationary reference beam or beams, the direction of said drawing to be parallel to the long dimension of said hologram film(s), and whereby moving imagery visible from within a system exit pupil is generated, first focusing means whereby the portion of said hologram film(s) illuminated by said reference beam(s) is substantially imaged onto said exit pupil, the long dimension of said hologram film(s) being imaged transversely to the normal eye plane, diffraction means comprising a diffraction grating or gratings, whereby said reference beam(s) is (are) generated by diffraction from a source beam or beams, zero order stop means, preferably a louvered filter or filters interposed between said diffraction grating(s) and said hologram film(s), whereby the portion of said source beam(s) not diffracted by said diffraction grating(s) is blocked from entering said exit pupil, a small light source or sources from which said source beam(s) originate(s), second focusing means interposed either between said light source(s) and said diffraction grating(s), or between said diffraction grating(s) and said hologram film(s), or between said hologram film(s) and said first focusing means, or a combination thereof, wherein said second focusing means without said diffraction means and said hologram medium present would image said light source substantially to a point central to the image, thereby eliminating chromatic dispersion at said point, and thereby causing imagery generated from any said time frame hologram and focused in a designated image plane containing said point to appear motionless as said time frame hologram is drawn across said reference beam.

* * * * *